(12) United States Patent
Frolik et al.

(10) Patent No.: US 8,552,396 B2
(45) Date of Patent: Oct. 8, 2013

(54) DISTRIBUTIVE, NON-DESTRUCTIVE REAL-TIME SYSTEM AND METHOD FOR SNOWPACK MONITORING

(75) Inventors: Jeff Frolik, Essex Junction, VT (US); Christian Skalka, Burlington, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 1022 days.

(21) Appl. No.: 12/566,797

(22) Filed: Sep. 25, 2009

(65) Prior Publication Data

US 2011/0073771 A1   Mar. 31, 2011

Related U.S. Application Data

(60) Provisional application No. 61/208,654, filed on Feb. 26, 2009.

(51) Int. Cl.
*G01T 1/00* (2006.01)

(52) U.S. Cl.
USPC ........................................................ 250/393

(58) Field of Classification Search
USPC ........................................................ 250/393
See application file for complete search history.

(56) References Cited

U.S. PATENT DOCUMENTS

| | | | | |
|---|---|---|---|---|
| 5,594,250 | A * | 1/1997 | Condreva ................... | 250/361 R |
| 6,957,593 | B1 * | 10/2005 | Burns ............................ | 73/866 |
| 7,408,463 | B2 * | 8/2008 | Hammond et al. ........ | 340/572.1 |
| 8,057,233 | B2 * | 11/2011 | Owen ........................... | 434/169 |
| 2005/0189494 | A1 * | 9/2005 | Conwell ................... | 250/363.04 |
| 2008/0164407 | A1 * | 7/2008 | Choquette et al. ............ | 250/262 |
| 2008/0184827 | A1 * | 8/2008 | Susfalk et al. ............... | 73/866.5 |

OTHER PUBLICATIONS

Skalka et al. "A distributed in situ measurement system for snow water equivalence," Whistler 2008 International Snow Science Workshop, Sep. 21-27, 2008, pp. 821-828.*

Abe et al. "Experimental study of microwave transmission in snowpack," IEEE vol. 28 No. 5, Sep. 1990, pp. 915-921.*

* cited by examiner

*Primary Examiner* — Constantine Hannaher
*Assistant Examiner* — Mindy Vu

(57) ABSTRACT

A ground-based system that provides quasi real-time measurement and collection of snow-water equivalent (SWE) data in remote settings is provided. The disclosed invention is significantly less expensive and easier to deploy than current methods and less susceptible to terrain and snow bridging effects. Embodiments of the invention include remote data recovery solutions. Compared to current infrastructure using existing SWE technology, the disclosed invention allows more SWE sites to be installed for similar cost and effort, in a greater variety of terrain; thus, enabling data collection at improved spatial resolutions. The invention integrates a novel computational architecture with new sensor technologies. The invention's computational architecture is based on wireless sensor networks, comprised of programmable, low-cost, low-powered nodes capable of sophisticated sensor control and remote data communication. The invention also includes measuring attenuation of electromagnetic radiation, an approach that is immune to snow bridging and significantly reduces sensor footprints.

11 Claims, 6 Drawing Sheets

DISTRIBUTIVE, NON-DESTRUCTIVE REAL-TIME SYSTEM AND METHOD FOR SNOWPACK MONITORING

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith.
1. U.S. provisional patent application 61/208,654, entitled "DISTRIBUTIVE, NON-DESTRUCTIVE REAL-TIME SYSTEM AND METHOD FOR SNOWPACK MONITORING", naming Jeff L. Frolik and Christian E. Skalka as inventors, filed 26 Feb. 2009.

REFERENCE TO U.S. GOVERNMENT INTEREST

"The U.S. Government has a paid-up license in this invention and the right in limited circumstances to require the patent owner to license others on reasonable terms as provided for by the terms of Vermont Space Grant NNG05GH16H awarded by NASA."

BACKGROUND

1. Field of Use

These teachings relate generally to a system and method for snow pack monitoring and more particularly to a ground based system that provides real time measurement and collection of snow-water equivalent (SWE) data in remote settings.

2. Description of Prior Art (Background)

The importance of snow water equivalence (SWE) estimation and snowpack studies to science and society is well known. For example, snowpack studies are critical to water planning for agriculture, recreation, cities, military, etc. The importance of snowpack data is emphasized by the fact that SWE data is so fundamental to so many interests that NOAA publishes daily global SWE composites online. As suggested in the literature most snow studies are motivated by the need to estimate basin-wide runoff to provide operational forecasting for snow-affected industries or rivers subject to flooding, or to improve climate forecasting. These applications require knowledge about the spatial distribution of SWE over large spatial scales, often in basins characterized by complex terrain and heterogeneous land cover. Prior research has demonstrated that SWE exhibits extreme variability in space. This variability is a result of influences of and interactions between meteorology (wind speed and direction, radiation), topography (elevation gradients, slope and aspect), and vegetation cover. In temperate landscapes, forest vegetation exerts important controls on snow distribution through its role in intercepting snow, attenuating wind, and altering radiation at the snow surface. Therefore, to obtain accurate SWE profiles of topographically complex areas, especially mountainous terrain, good temporal and spatial resolution is needed, with techniques that are robust to the effects of vegetation cover.

While several approaches exist for measuring and quantitatively characterizing the spatial distribution of SWE, including manual surveys and airborne sensors, continuous, automated ground-based techniques allow for better spatial resolution, more frequent measurement, and are not affected by tree canopies. Emerging approaches exploit various technologies, including gamma ray detection and acoustics, but these are largely still in the development phase and have not been deployed remotely as continuous, unmanned stations. The most prevalent ground-based, continuous method of SWE measurement makes use of snow pillows, which measures now mass by measuring loads on liquid-filled bags (the pillow). In particular, the SNOTEL network run by the NRCS (Natural Resources Conservation Service) relies heavily on snow pillow technology. However, this method is susceptible to the phenomena of snow bridging (a gap forming between the snowpack and the ground). To mitigate (i.e., average out) the snow bridging effect, snow pillows are made large, approximately 50 to 100 square feet on average, and thus contain up to several hundred gallons of liquid, typically antifreeze. This means that snow pillows can only be installed in large, flat areas to accommodate their size, and near roads or well-established trails for transporting the apparatus. Large plate-style snow load sensors with multiple load nodes and associated analytic techniques to correct for snow bridging have been proposed to supplant snow pillows, but this technology is not yet extensively used in practice. The upshot of this is that in addition to inaccuracies due to snow bridging, predominant ground-based SWE measurement technologies do not provide effective resolution at the basin scale, due to their expense and difficulty of deployment.

In the SNOTEL network this is exacerbated by the general reliance on traditional data logging platforms such as the Campbell Scientific CR1000, which are heavy, expensive, and power hungry. Indeed, most long-term continuously monitoring snow stations are located in clearings, representing a biased measurement of SWE. Thus, developing a system to cost effectively collect data to improve the spatial and temporal resolution of SWE monitoring would have important impacts on both the scientific study of snow and social infrastructures dependent on snow. Furthermore, a system that is compact and portable would have the advantage of being deployable in variety of settings including those presently not observable with remote sensing technologies (e.g., snow packs under forest canopies or on sloped terrain). A low cost SWE data collection system would allow more data points to be measured, further improving spatial resolution, and would bring this technology to a broader user base.

In light of the above, there exists a need for a relatively inexpensive and easily deployable sensor platform that can be wirelessly networked, remotely accessed, and is robust to harsh winter environments.

There is also a need for a novel SWE measurement instrument suite and control algorithms suitable for integration with a relatively inexpensive and easily deployable sensor platform that can be wirelessly networked, remotely accessed, and is robust to harsh winter environments.

BRIEF SUMMARY

The foregoing and other problems are overcome, and other advantages are realized, in accordance with the presently preferred embodiments of these teachings.

In accordance with one embodiment of the present invention an apparatus for determining snow-water equivalence for snow pack monitoring is provided. The apparatus includes a wireless mote having a processor; random access memory (RAM); flash memory; and a communicator for wirelessly communicating. The apparatus also includes a gamma ray detector for measuring ambient gamma ray attenuation due to snowpack water content.

The invention is also directed towards a method for distributive snowpack monitoring. The method includes determining a snow water equivalent data package, which includes: measuring in situ snowpack temperature data at a first location; determining if the measured in situ snowpack temperature data exceeds a predetermined temperature threshold; measuring in situ snowpack height data at the first location; and determining if the measured in situ snowpack height data exceeds a predetermined height threshold. If either threshold is exceeded the method measures snowpack in situ microwave attenuation at the first location and determines if the measured snowpack in situ microwave attenuation exceeds a predetermined microwave attenuation threshold. If the microwave attenuation threshold is exceeded the method measures the snowpack in situ gamma ray attenuation at the first location.

In accordance with another embodiment of the present invention an apparatus for determining snow-water equivalence for snow pack monitoring is provided. The apparatus includes a wireless mote having: a processor; random access memory (RAM); flash memory unit(s); and a communicator for wirelessly communicating. The wireless mote also includes a program storage device readable by the mote, tangibly embodying a program of instructions executable by the mote to perform a method for collecting sensor data, managing power requirements, wireless transmitting sensor data, and receiving control data. The apparatus sensors include: at least one gamma ray detector for measuring ambient gamma ray attenuation; a 2.4 GHz microwave source; a 2.4 GHz microwave detector paired with the 2.4 GHz microwave source; a 5.1 GHz microwave source; and a 5.1 GHz microwave detector paired with the 5.1 GHz microwave source.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
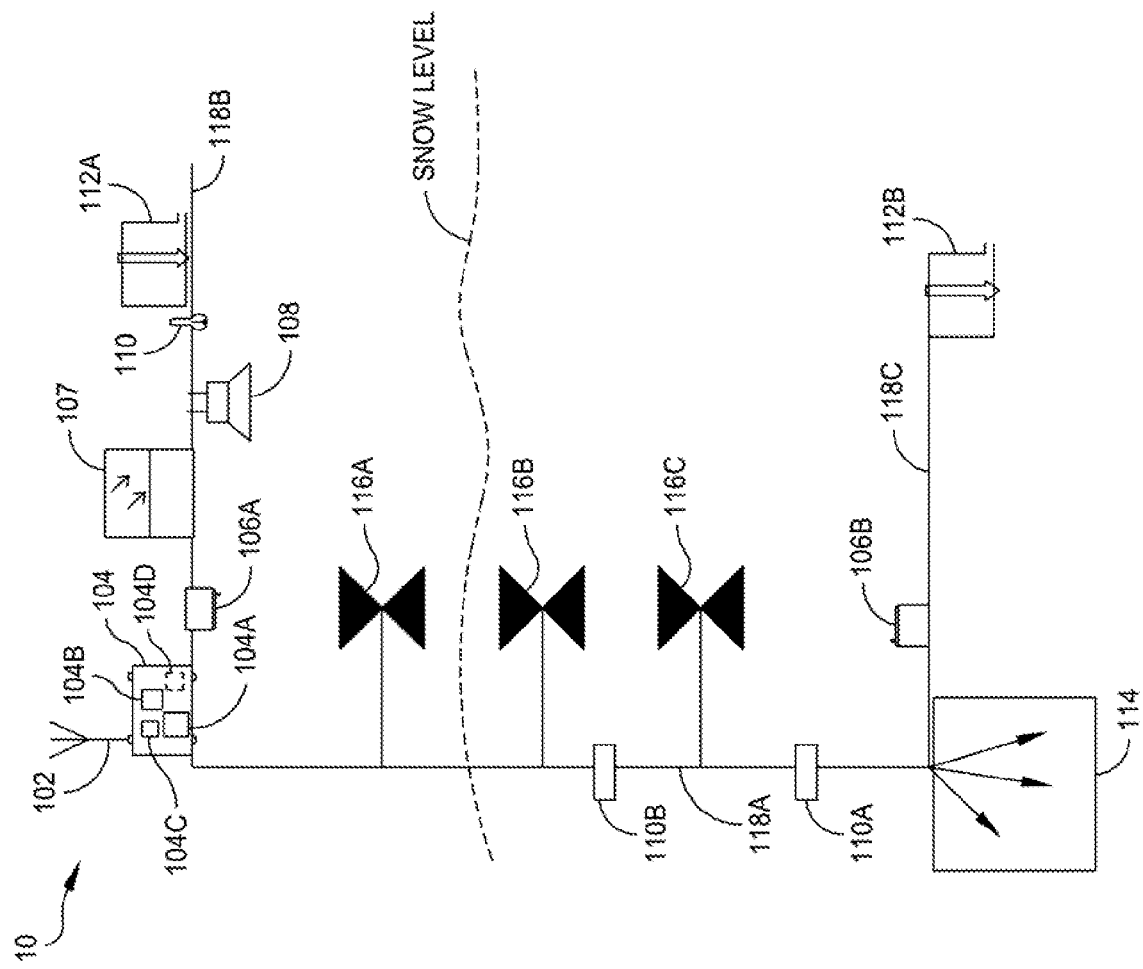
FIG. 1 is pictorial illustration of one embodiment of the present non-destructive real-time system SWE measurement apparatus in accordance with an embodiment of the present invention.

Referring now to FIG. 1 there is shown a SWE mote based computational and communications platform 10 that enables instrumentation of environments with greater temporal and spatial resolutions than are presently possible in a relatively non-intrusive manner. It will be appreciated that the SWE platform 10 shown in FIG. 1 may be more broadly deployed for a wide range of environmental monitoring applications.

As used in this disclosure, the term "mote device" or "mote" (FIG. 1, item 104) typically indicates a autonomous or semi-autonomous computing, communication, actuating, and/or sensing device as described in the mote literature (e.g., Intel Corporation's, or Crossbow Inc.'s mote literature).

Certain embodiments of the mote device(s) 104 can be fabricated to be relatively small (typically less than several inches in dimension, often a fraction of an inch). Certain embodiments of mote systems(s) 10 can also be relatively inexpensive to produce, and can be designed to stand up to relatively harsh and/or external environments.

Many embodiments of mote systems(s) 10, or simply "motes", as described in this disclosure can provide a wide variety of parameter sensing and/or actuating functionalities. Such parameter sensing may be controlled (and/or light or display devices actuated) using computer-based sensing, electro-mechanical sensing, magnetic sensing, and/or other sensing techniques. Certain embodiments of mote device(s) and networks can be located at remote, hostile, external, or inaccessible location(s); and can be wirelessly networked.

Motes 104 can be programmed with control algorithms for auxiliary circuitry managing activation of sources and sensors, to ensure that energy is expended in an efficient manner, and to dynamically adapt deployments to environmental conditions.

Still referring to FIG. 1 there is shown a pictorial illustration of one embodiment of the present non-destructive real-time system SWE measurement apparatus 10 in accordance with an embodiment of the present invention. In FIG. 1 there is shown a programmable mote device 104, equipped with processor 104A, RAM 104B and Flash memory 104C. Optionally, mote 104 can be augmented with external memory 104D. Motes also have a communication device 102 capable of approximately 100 meter communication range, and can support a variety of data retrieval techniques.

It will be appreciated that the invention advantageously incorporates motes 104 to eliminate the wiring burdens and heavy enclosures often required of traditional data logging mechanisms, and significantly reduces power requirements. As shown in FIG. 1, communication device 102 may be any suitable communication device which supports other data acquisition and/or system control. The mote system (FIG. 1, item 10) establishes a standard protocol connection, for example, but not limited to, a TCP/IP connection with another mote system. (See FIG. 2). This standard protocol allows an easy interface to data storage and visualization applications at the sink. Furthermore, this TCP/IP connection serves as an actuation channel, for controlling the deployment remotely at the sink, for example to modify sampling rates for power management.

Figure 2:
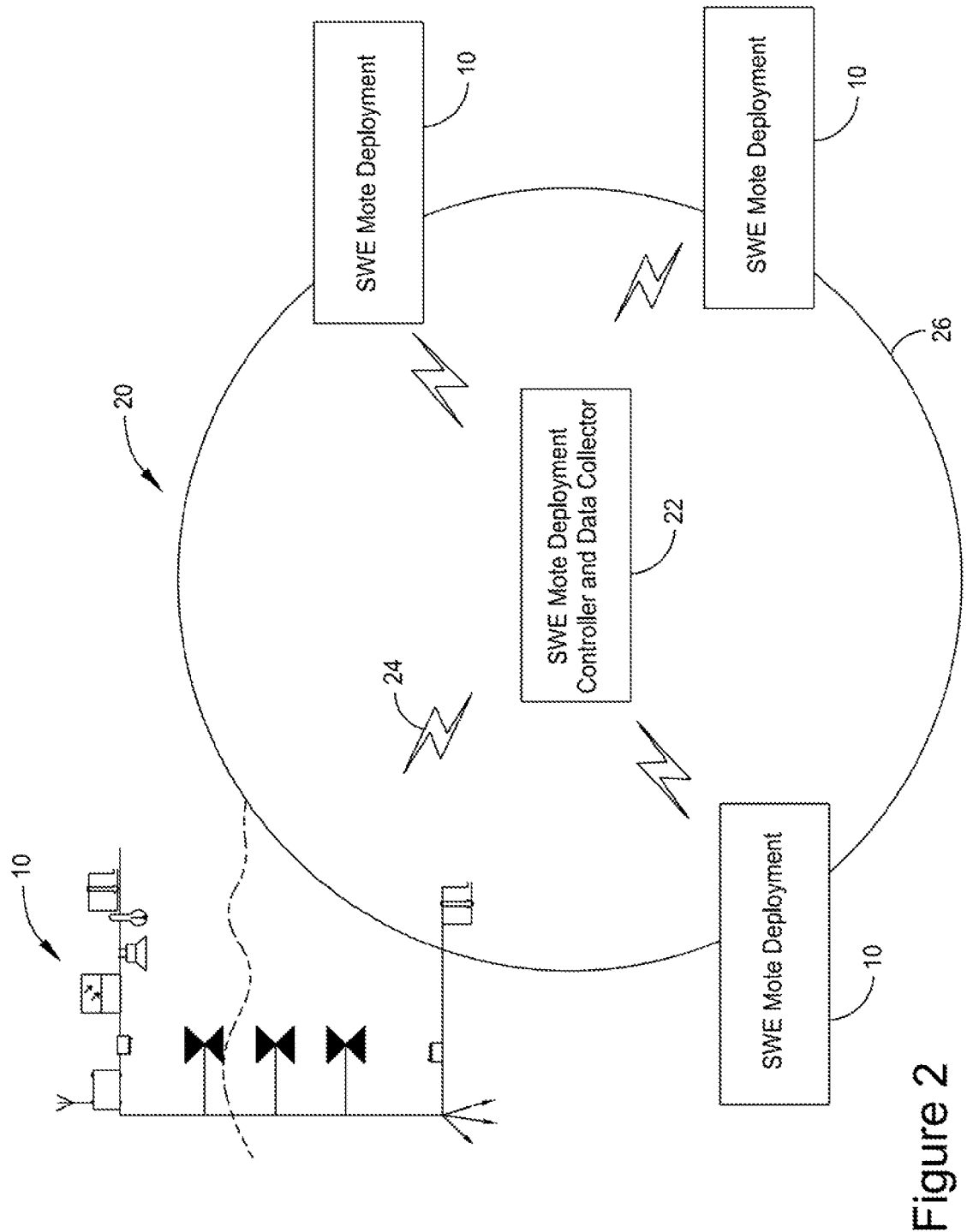
FIG. 2 pictorial illustration of a distributive wireless sensor network, non-destructive real-time system in accordance with the invention shown in FIG. 1.

Still referring to FIG. 1 and FIG. 2, the mote network nodes (motes) 10 communicate with each other via their radio frequency (RF) antennas 102 (communicators), each with ~100 M range, forming an on-site network 20. It will be appreciated that any suitable mote communication protocol may be used. All the mote nodes 10 communicate their data to a distinguished node or data collector designated as the "gateway" 22 that buffers data on external storage (not shown) and can communicate data long distance to a remote location (i.e. the lab, or ultimate data sink). Communication options include radio modems and cell modems. Cell modem technology is particularly appealing since communication range is effectively unlimited for deployments in cell phone reception areas. Using any suitable modem or communication device at the deployment site and at the data sink communicating via GPRS.

Still referring to FIG. 1, the SWE measurement apparatus (SWEMA) 10 also includes a support structure 118B, which may be any suitable support structure. The support structure 118B supports: mote device 104; microwave source 106A; optionally, a solar cell 107 for recharging SWEMA 10 power source, typically, but not limited to, one or more batteries (not shown); ultrasonic transducer 108 for measuring snow height, ambient air temperature device 110, and gamma ray detector 112A.

Still referring to FIG. 1, SWEMA 10 includes a vertical support structure 118A. The vertical support structure 118A supports microwave detectors 116A, 116B, and 116O. Vertical support structure 118A also supports snowpack temperature devices 110A, 110B. It will be understood any suitable number of temperature devices may be used. It will be appreciated that the vertical support structure 118A may be any suitable calibrated or un-calibrated support structure.

SWEMA 10, as shown in FIG. 1, includes anchoring system 114. It will be understood that anchoring system 114 may be any suitable terrain adapted anchoring system.

Optionally, included with SWEMA 10 is base support 118C. It will be understood that any suitable base support may be used and that natural ground cover may be used as base support 118C. Base support 118C supports a second microwave detector 106B and a second gamma ray detector 112B. It will be understood that the microwave sources 106A, 106B and microwave detectors 116A, 116B, and 116C, may be any suitable microwave source and respective microwave detector.

It will be understood that all measurement devices, sensors, electronic devices, and power sources shown in FIG. 1 are connected, or connectable, to mote device 104.

In general, the mote device 104 can be considered a small processor-driven device that can be configured to perform a variety of functions. Many embodiments of mote device(s) 104 can include a power source, which can be configured to provide power or energy to the mote during its normal operations. Certain embodiments of mote systems(s) 10, as described in this disclosure for example, can be configured to sense a variety of parameters, actuate a variety of other devices such as (but not limited to) turn on or off a power relay (See FIG. 7).

Figure 3:
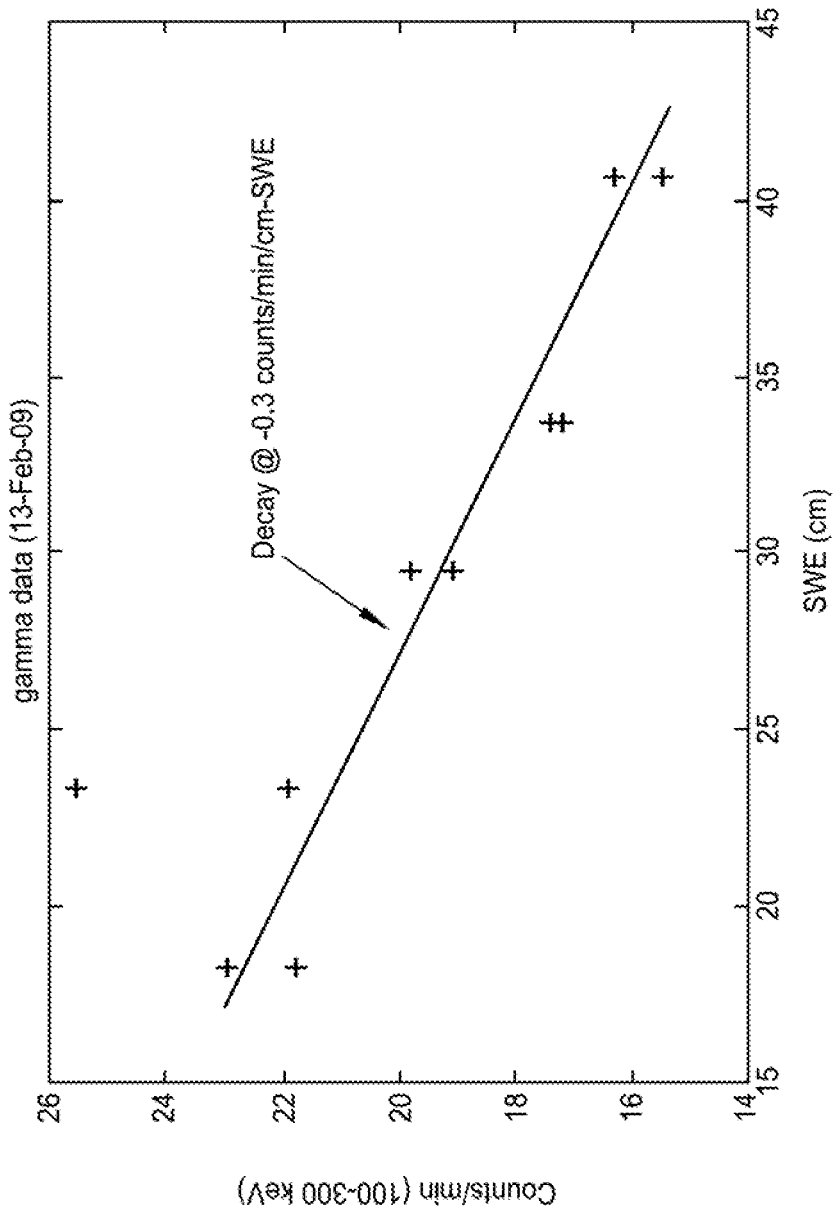
FIG. 3 is a graph showing gamma absorption due to a snowpack as a function of SWE in accordance with the invention shown in FIG. 1.
Figure 4:
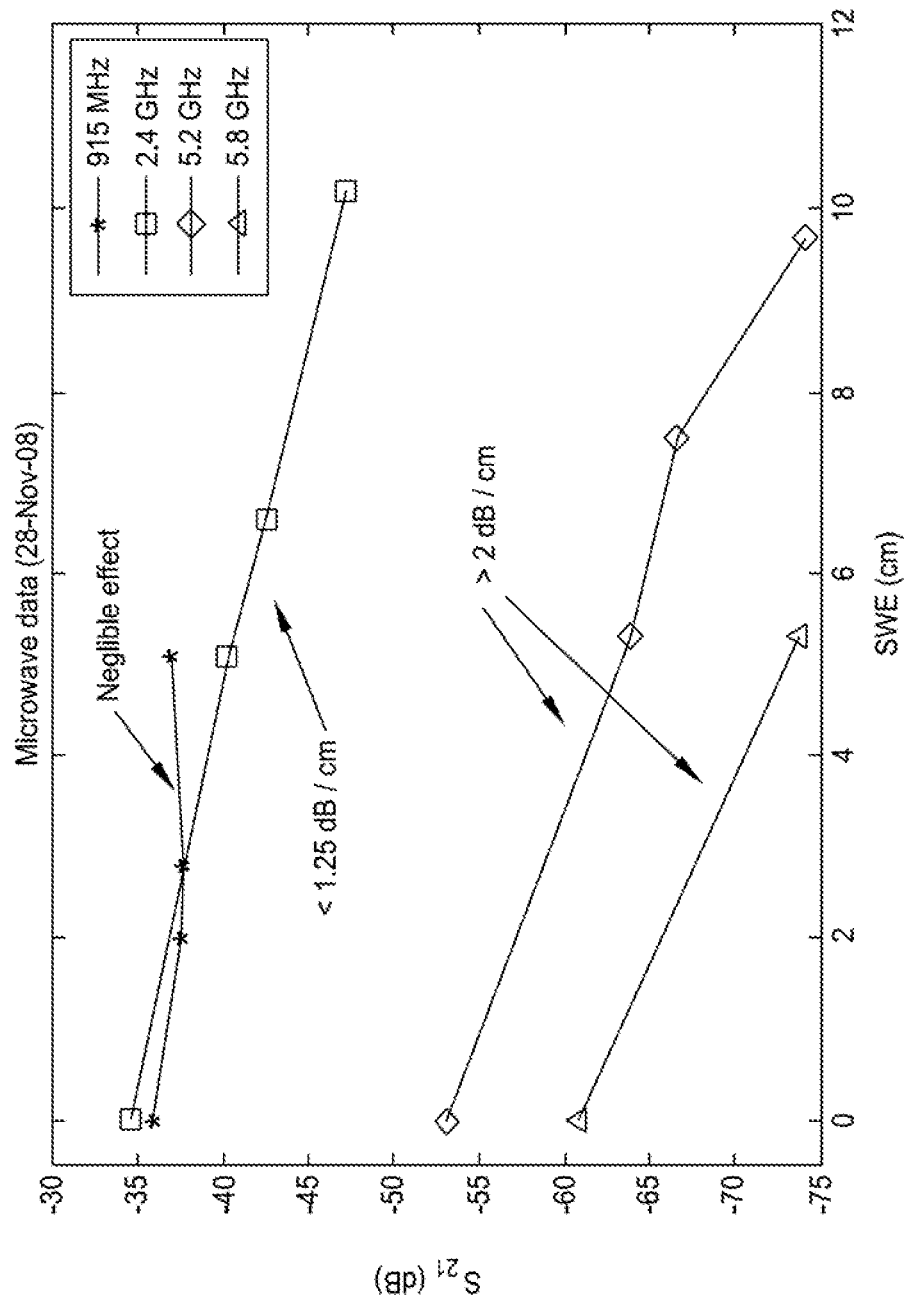
FIG. 4 is a graph showing microwave attenuation due to a snowpack at different frequencies as a function of SWE in accordance with the invention shown in FIG. 1.

Still referring to FIG. 1 and also FIG. 3, there is shown a gamma ray attenuation detector 112A, 112E apparatus connectable to the deployed mote station. It will be appreciated that a gamma ray attenuation detector 112A, 112B, such as, but not limited to, a Cadmium Zinc Telluride (CZT) gamma ray detector may be used to measure water attenuation of ambient or background radiation. FIG. 4 shows measured water attenuation of gamma energy using all energies between 100 keV to 300 keV.

Still referring to FIG. 1 and also FIG. 4, there is shown the susceptibility of microwave radiation to snowpack accumulation having significant water content. The horizontal scale of FIG. 4 is in days and the vertical scale is in relative attenuation in dB. It will be understood that any suitable microwave band or bands, such as a dual-band system (2.4 GHz and 5.1 GHz) may used in which signal strength is monitored at various heights. In general attenuation rates are expected to be 20-100 dB/m in these bands depending on snow properties, however measurements with large dynamic range, at various heights and at different frequencies, can be used to solve for SWE and as well as snow structure. Still referring to FIG. 1 there is shown a microwave testing arrangement consisting of a microwave source 106B placed on the ground support 112B, a microwave source attached to support 118B and at least three microwave detectors 116A, 116B, and 116C attached to support 118A. The microwave sources are operating at 2.4 GHz and at 5.1 GHz). FIG. 4 illustrates that attenuation in both the 2.4 GHz and 5.1 GHz bands are susceptible to winter precipitation high in water content (e.g., from ice storms).

Data retrieval. Referring to FIG. 2 there is shown a pictorial illustration of a distributive wireless sensor network (WSN) 20, non-destructive real-time system in accordance with the invention shown in FIG. 1. As noted earlier, a mote-based platform as described herein supports a variety of data acquisition and retrieval techniques. The simplest is data logging, and subsequent retrieval over Ethernet connection with a laptop carried to the deployment site. However, off-the-shelf motes typically have only 1 MB flash memory available for data logging, which is generally not sufficient for a full season of SWE operation. It will be appreciated therefore, that the current invention employs a lightweight data muting option 22.

Still referring to FIG. 2, for purposes of this disclosure data muling is defined as a site visitor carries a mule mote 22 with a program that automatically downloads data via a communications link 24 to the mule 22 when the mule mote 22 is in radio transceiver range of the deployed mote system 10. This data retrieval option exploits native features of WSNs that are designed to dynamically integrate new mote nodes into their network 26. Since the weight of a mote is negligible, this approach allows more frequent site visits. It will be understood that the mule mote 22 can be hand carried or affixed to a suitable remote controlled platform such as but not limited to unmanned aerial drones or remote terrain vehicles (not shown). It will be appreciated that the data muling option described herein can be used in practice for SWE measurements without data loss. For example, measurement data from approximately 1-hour sampling intervals over a month is suitably sized for on-mote flash memory.

Still referring to FIG. 1, it should be appreciated that the mote 10 may be suitably augmented with flash memory (FIG. 1, 104D). It will be further appreciated that the invention's low cost features of the individual stations 10 allow more stations 10 to be deployed to obtain better spatial resolution; and wireless networking 20 allow multiple sites in a given area to cooperate in routing data to a single gateway 22 for communication to the sink. Such an area can be any suitable number of acres, yielding an efficient technique for fine-grained monitoring at the basin scale.

Still referring to FIG. 2, it will also be appreciated that the mule mote or gateway node 22 can be augmented with on-site massive flash memory storage (2 GB) for buffering an entire season's worth of data, as a backup in case remote reporting via cell or radio modem fails or is not possible.

Still referring to FIG. 1 and FIG. 2, data can also be mirrored within the WSN 20, meaning that mode deployments 10 can cooperate to data synchronize and log data redundantly to mitigate volatility of individual mote deployments.

Figure 5:
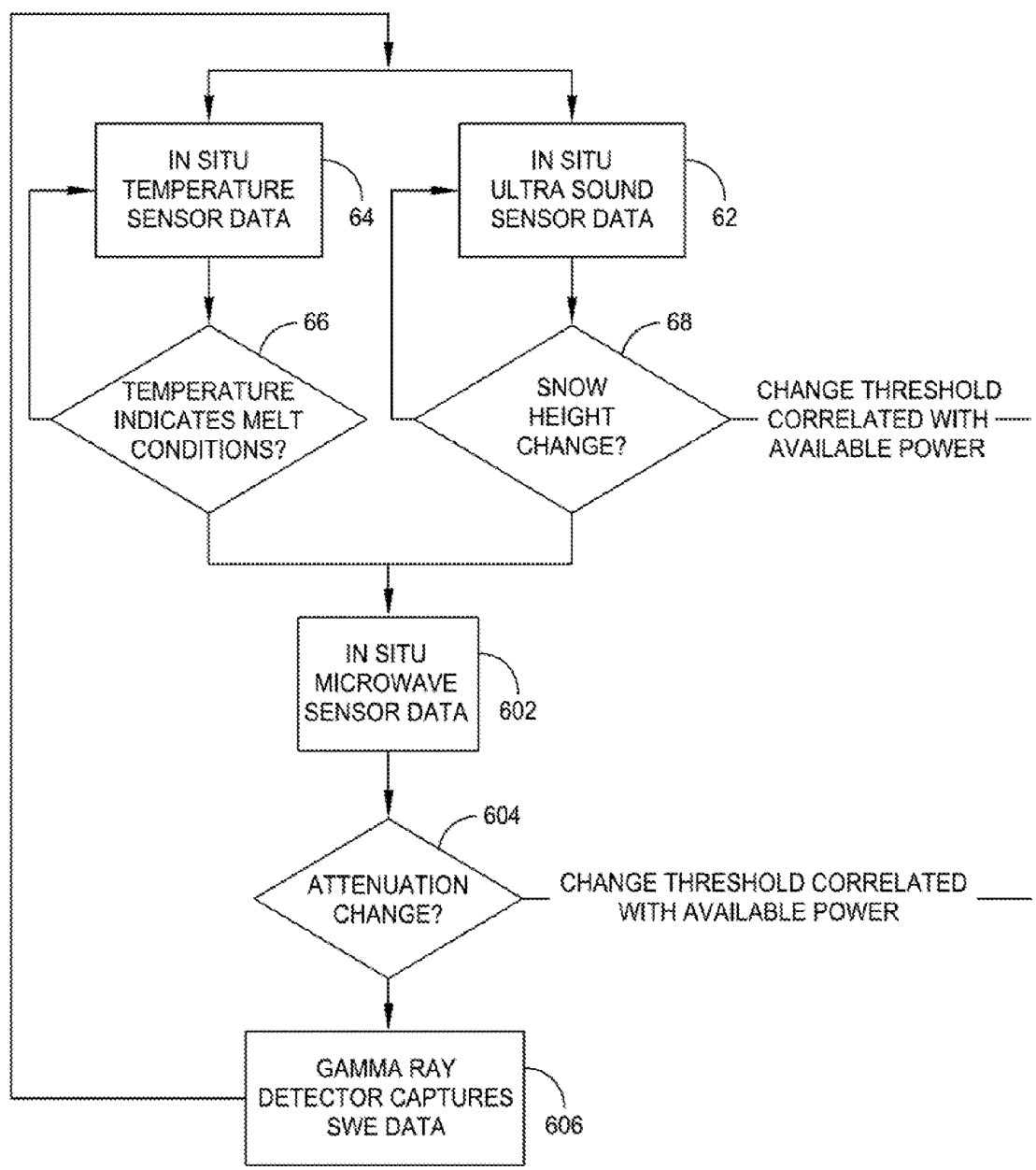
FIG. 5 is a flow chart illustrating one method for power conservation for the invention shown in FIG. 1.

Still referring to FIG. 1 and FIG. 5, where FIG. 5 shows a flow chart illustrating one method for power conservation for the invention shown in FIG. 1. It will be appreciated that gamma ray detection device(s) 112A,112B, such as the CZT device, is the most accurate in terms of SWE measurements and least susceptible to inclusions in the snowpack (e.g., ice lenses, air/water pockets). However, as noted, due to the gamma ray detection device power requirements it is not, in terms of power consumption, feasible for this device to be utilized continually, therefore, a feature of the invention employs a multi-parameter, multi-tiered, adaptive sampling method as shown in FIG. 5 to optimize a balance of measurement accuracy and energy usage. The sampling of a particular sensor is conditional on previous and current values found on other sensors. In the present invention, the sensors having the least energy draw (i.e., ultrasound) are the least accurate in determining SWE (i.e., only snow pack depth is measured). However, the ultrasonic depth sensor 106A would be capable of capturing a new snow event. Conversely, the 'best' SWE (i.e., CZT) also requires a relatively large amount of energy. Also, temperature sensors (FIG. 1. 110A, 110B) (FIG. 5, 64) within the snow pack may be utilized to detect melt conditions 66. That is, these simple and low energy modalities can run at higher sampling intervals and be used to trigger subsequent sensors that would provide new information (See FIG. 5). For example, should a snow fall be detected via depth change (cost of ~5 mA) the invention will trigger a microwave measurement (FIG. 5, 202) (cost of ~50 mA). Should the snow fall be very dry (i.e., little water content) there will be very little variation in signal strength (FIG. 5, 602) However, snow events high in water content will show significant changes in microwave signal strength. Such measurements will then be used to trigger a CZT or gamma ray measurement (cost of ~500 mA) (FIG. 5, 606). Sampling rates, change thresholds (e.g., temperature, height, attenuation) may be correlated with available power. In other words, sampling rates may be higher and/or thresholds lower if more power is available, e.g., batteries are fully charged. It will be appreciated that this multi-tiered, event-driven approach can be readily implemented upon resource-constrained motes running TinyOS.

Figure 6:
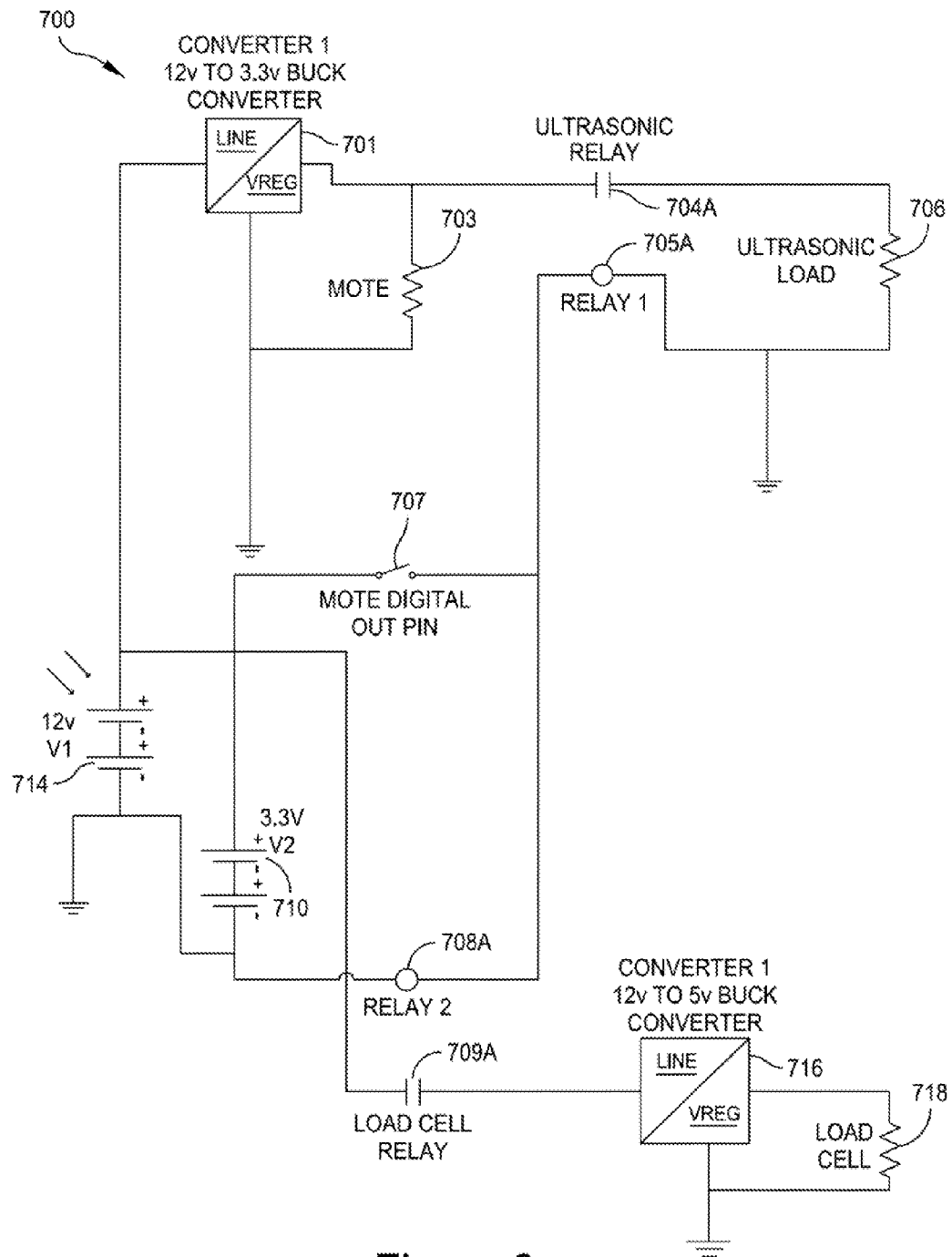
FIG. 6 is a circuit schematic illustrating one circuit for power conservation for the invention shown in FIG. 1.

Still referring to FIG. 1 and also to FIG. 6 there is shown a circuit schematic illustrating one circuit 700 for power conservation for the invention shown in FIG. 1. To efficiently regulate the power source to the required voltage levels for each component of the system, dual DC-DC buck converters 701, 718 are used. The buck converters 701, 718 convert the 12 VDCsource down to 3.3 VDC, schematically represented as power source 710, to power the mote 703 and the Ultrasonic depth sensor, and 5 VDC to power the load cell. It will be appreciated that the converters may be any suitable converters and that the load cell may be any suitable load. If the SWEMA 10 is programmed to take readings from the sensors hourly then there is substantial time between readings when the sensors are not in use. By utilizing the output pins on the mote 104 I/O, a digital trigger on a mote can be provide a signal to switch 707 a relay 708A,709A. Switching the relay 708A,709A powers down the 12-to-5V buck converter 716 when the load cell 718 is not required to be in use. Another relay 704A, 705A also allows the Ultrasonic Load 706 to be powered down by creating an open circuit. It will be appreciated that powering down the 12 to 5V buck converter 716 and turning off the Ultrasonic sensor load 706, conserves otherwise wasted power which is important when dealing with a remote systems and limited battery life. It will be appreciated that any suitable energy optional energy harvesting devices may be used (e.g., photovoltaic technology) (e.g., FIG. 1, 107) to extend battery life.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. An apparatus for determining snow-water equivalence for snow pack monitoring, the apparatus comprising:
    at least one wireless mote, wherein the wireless mote comprises:
        at least one processor;
        at least one random access memory (RAM);
        at least one flash memory unit;
        a communicator for wirelessly communicating;
    at least one gamma ray detector for measuring ambient gamma ray attenuation due to snowpack water content, wherein the at least one gamma ray detector is connectable to the wireless mote.

2. The apparatus as in claim 1 further comprising:
    at least one microwave source; and
    at least one microwave detector paired with the at least one microwave source, wherein the at least one microwave source and the at least one microwave detector are connectable to the at least one wireless mote.

3. The apparatus as in claim 2 wherein the at least one microwave source comprises:
    at least one 2.4 GHz microwave source;
    at least one 2.4 GHz microwave detector;
    at least one 5.1 GHz microwave source; and
    at least one 5.1 GHz microwave detector.

4. The apparatus as in claim 1, further comprising at least one ultrasonic transducer for measuring snowpack height, wherein the at least one ultrasonic transducer is connectable to the at least one wireless mote.

5. The apparatus as in claim 1, further comprising at least one snowpack temperature device, wherein the at least one snowpack temperature device is connectable to the at least one wireless mote.

6. The apparatus as in claim 1, further comprising a photovoltaic energy converter, wherein the photovoltaic energy converter is connectable to the at least one wireless mote.

7. An apparatus for determining snow-water equivalence for snow pack monitoring, the apparatus comprising:
    at least one wireless mote, wherein the wireless mote comprises:
        at least one processor;
        at least one random access memory (RAM);
        at least one flash memory unit;
        a communicator for wirelessly communicating;
        a program storage device readable by the mote, tangibly embodying a
    program of instructions executable by the mote to perform a method for collecting sensor data, managing power requirements, wireless transmitting sensor data, receiving control data;
    at least one gamma ray detector for measuring ambient gamma ray attenuation due to snowpack water content, wherein the at least one gamma ray detector is connectable to the wireless mote,
    a 2.4 GHz microwave source:
    a 2.4 GHz microwave detector paired with the 2.4 GHz microwave source, wherein the a 2.4 GHz microwave source and the 2.4 GHz microwave detector are connectable to the at least one wireless mote:
    a 5.1 GHz microwave source; and
    a 5.1 GHz microwave detector paired with the 5.1 GHz microwave source, wherein the a 5.1 GHz microwave source and the 5.1 GHz microwave detector are connectable to the at least one wireless mote.

8. The apparatus as in claim 7 wherein the at least one gamma ray detector comprises a cadmium zinc telluride (CZT) gamma ray detector.

9. The apparatus as in claim 7, further comprising an ultrasonic transducer for measuring snowpack height, wherein the ultrasonic transducer is connectable to the at least one wireless mote.

10. The apparatus as in claim 7 further comprising at least one snowpack temperature gauge.

11. The apparatus as in claim 7 further comprising at least one solar cell connectable to the wireless mote.

* * * * *